Sept. 5, 1933.  E. X. SCHMIDT  1,925,463
METHOD OF AND APPARATUS FOR TEMPERATURE CONTROL
Filed March 3, 1932
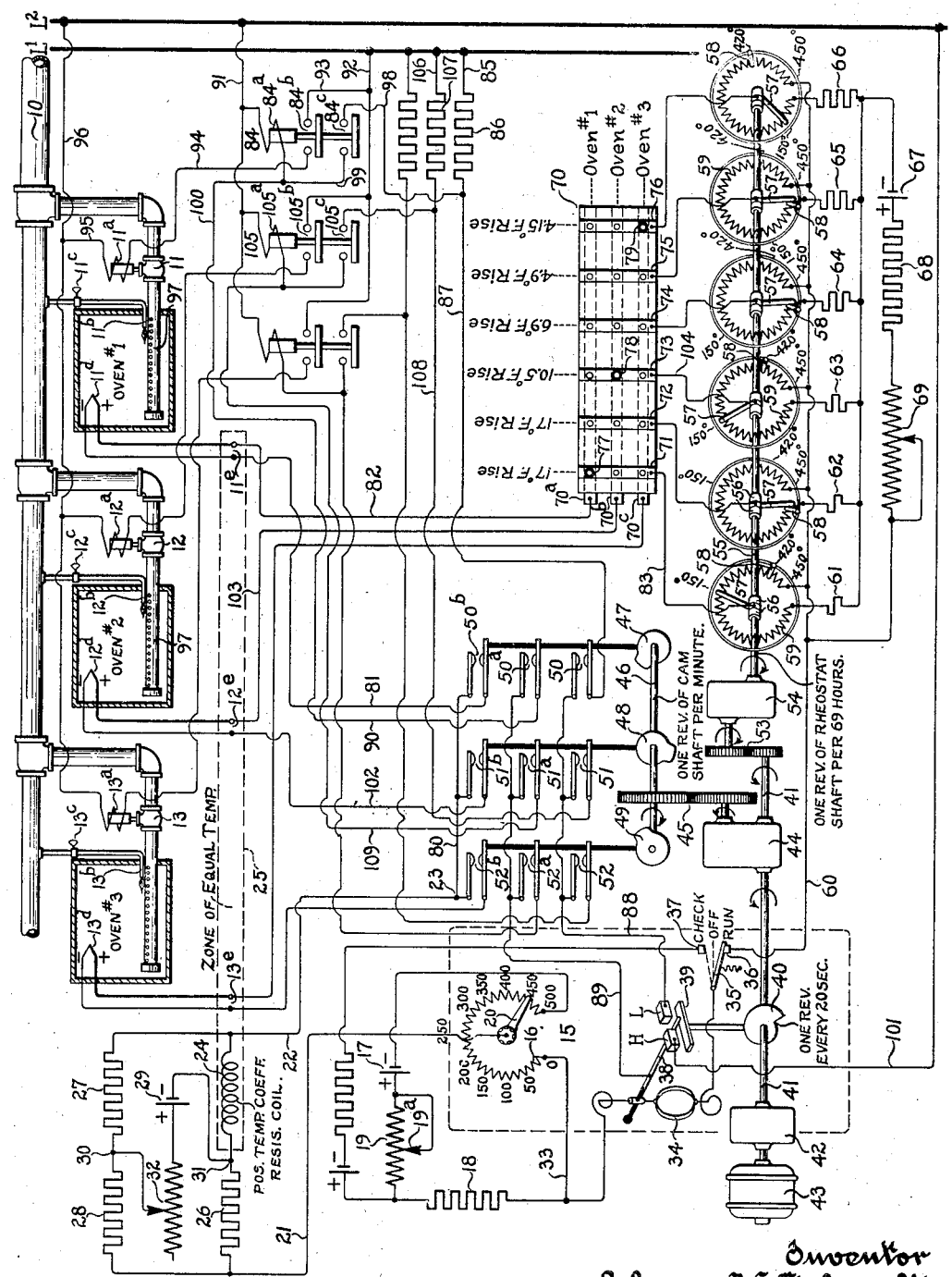

Patented Sept. 5, 1933

1,925,463

UNITED STATES PATENT OFFICE 1,925,463

METHOD OF AND APPARATUS FOR TEMPERATURE CONTROL

Edwin X. Schmidt, Whitefish Bay, Wis., assignor to Cutler-Hammer, Inc., Milwaukee, Wis., a corporation of Delaware Application March 3, 1932. Serial No. 596,559.

11 Claims. (Cl. 236—15)

This invention relates to improvements in methods of and apparatus for temperature control, and while not limited thereto the invention relates more particularly to control of the temperatures of heat-treating ovens and the like.

An object of the invention is to provide a novel method of controlling the increase in oven temperature from a given predetermined value to another predetermined value slowly and at a substantially constant rate per unit of time.

Another object is to provide such a method wherein the initial and final operating temperatures may be definitely pre-selected and wherein the last mentioned temperature is maintained substantially constant for the desired period of time.

Another object is to provide a method affording accurate control of the rates of increase in temperature of a plurality of ovens, and wherein such rates of increase in temperature may be selectively rendered of like or different values.

Another object is to provide a method of the character aforementioned wherein a plurality of ovens may be subjected to the respective rates of temperature change preselected therefor under conditions of simultaneous or sequential initiation of operation of the several ovens.

Another object is to provide novel means for carrying out the methods of control aforementioned.

Another object is to provide a novel combination of mechanical and electrical elements to afford a control system of the character herein contemplated.

Other objects and advantages of the invention will hereinafter appear.

The accompanying drawing illustrates schematically and diagrammatically a control system constructed in accordance with my invention and adapted for carrying out the methods herein described,—it being understood that the embodiment illustrated is susceptible of modification in the details of construction thereof without departing from the scope of the appended claims.

In the art of heat-treating or curing articles molded from a composition of organic binder materials and a suitable filler it is extremely desirable that such articles shall be subjected in the curing oven to a relatively low initial temperature and that the temperature shall be slowly increased by substantially equal increments throughout a relatively prolonged period of time until the maximum temperature to which the articles are to be subjected has been attained. In general the ideal maximum temperatures to which molded insulation articles are to be subjected are determined primarily from a consideration of the size and shape thereof and the characteristics of the particular plastic composition. The character of heat-treatment which will provide the best cure for articles of a given shape and size and of a particular composition would be known to one skilled in the art, or could be readily ascertained by experiment. Heretofore it has been practically impossible for the attendant to so control the supply of the heating medium to the oven as to insure the desired gradual increase in temperature, and to insure attainment of an oven temperature equal to but not in excess of the final temperature desired. The difficulties are of course increased where the attendant is required to manage and endeavor to control a number of curing ovens. It is therefore evident that under the conditions aforedescribed it was practically impossible to insure definite and proper control of the heat-treatment of heat-indurable molded articles.

A control system constructed in accordance with and adapted for carrying out my invention comprises essentially the combination with a standard form of potentiometer type pyrometer controller of means for progressively increasing the temperature or temperatures in one or more curing ovens. In the particular installation herein disclosed control for three ovens is provided,—a choice of five different rates of temperature rise is provided for each of the ovens, and the arrangement is such that the initial and final temperatures of each oven and the rate of increase in the oven temperature is or may be controlled automatically and entirely independently of the control for the other ovens.

The novelty of the invention resides essentially in the idea of adding a controlled variable potential to the potential generated by a controlling thermo-couple located within the oven and balancing the combined value of said potentials against the potential of the aforementioned standard potentiometer type controller. By changing the aforementioned variable potential in accordance with the desired characteristics as a function of time any desired temperature cycle for each of the respective ovens may be obtained.

Referring to the single figure of the drawing, I have shown diagrammatically three ovens, marked respectively oven #1, oven #2, and oven #3,—but as will be understood from the following description the number of ovens to be controlled may be increased or decreased as desired,—the number of individual control parts being changed accordingly. The ovens are shown as supplied with a combustible gas from a common source of supply such as the conduit designated by the numeral 10. It is to be understood, however, that any other suitable heating medium may be employed if desired.

The supply of combustible fluid to the burners of the respective ovens is controlled by individual electromagnetically operable valves 11, 12 and 13 which are normally biased to closed position and adapted to be opened upon energization of the respective solenoid windings 11a, 12a and 13a. Any well known means (not shown) may be provided for supplying combustion air to the respective burners. Pilot burners 11b, 12b and 13b are preferably provided, the same being connected directly with the source of combustible fluid supply through conduit 10,—manually operable valves 11c, 12c and 13c being provided for regulating the supply of fluid to the pilot burner and for entirely shutting off the supply thereto when desired.

Located at suitable points within the respective ovens are bi-metallic thermo-couples of well known form,—the hot junctions of the respective thermo-couples being shown at 11d, 12d and 13d and the cold junctions thereof being shown at 11e, 12e and 13e.

The potentiometer type pyrometer controller of a well known form is designated in general by the numeral 15,—the same having a slide wire resistor 16 the terminals of which are connected across the terminals of a single dry cell battery 17 through a suitable fixed resistance 18 and a resistance 19 which is adjustable as shown to compensate for variations in battery voltage. Cooperable with the slide wire 16 is a contactor 20, said contactor being movable at will to pre-select a temperature at least as high as the maximum temperature to which any or all of the ovens will be subjected. Contactor 20 is connected by conductors 21 and 22 to a common point 23 in the circuits of thermo-couples 11d, 12d and 13d, suitable means of a well known character being interposed between conductors 21 and 22 to compensate for variations in the temperature (such as room temperature) to which the cold junctions 11e, 12e and 13e are subjected. Said means comprises essentially a resistance coil 24 having a positive temperature coefficient of resistance,—which as indicated by the dotted line rectangle 25 is subjected to the same temperature conditions as the aforementioned cold junctions. Connected in series with coil 24 is a suitable fixed resistance 26,— a pair of fixed resistances 27 and 28 are connected in parallel with coil 24 and resistance 26, and the opposite terminals of a standard single dry cell battery 29 are connected to the mid-points 30 and 31 of said pairs of resistance elements. An adjustable resistance 32 is likewise provided to compensate for voltage variations of battery 29. The characteristics of this type of temperature compensating device are well known to those skilled in the art, and further description thereof is deemed unnecessary.

A conductor 33 leads from the left hand end of slide wire resistor 16 of the pyrometer controller to and through the sensitive coil 34 of a galvanometer, the lower terminal of said coil being electrically connected with a switch contactor 35 which may be biased as shown to its lower extreme position wherein it engages a fixed contact 36 to provide running or operative connections for the system as a whole, or the same may be moved to an intermediate "off" position whereby the control system is disabled, or to its upper extreme position wherein it engages the stationary contact 37 to permit checking the potential drop across slide wire resistance 16 against the desired potential drop,—the contactor 19a being adjustable as shown to provide means for insuring such potential.

The needle 38 of the galvanometer is normally biased to an intermediate or neutral position as shown, and the same is movable under given conditions to a position underlying one of the fixed contacts marked H and L,—a clamping plate 39 being movable upwardly every twenty seconds to press the needle against one or the other of said contacts if the needle is out of neutral position. The means for moving plate 39 preferably comprises a cam or eccentric 40 fixed to a shaft 41, said shaft being driven through suitable speed reducing gearing 42 by a constant speed electric motor 43.

Also driven by shaft 41 through suitable gearing 44 and 45 is a shaft 46 carrying three cams 47, 48 and 49 the high portions of which are angularly spaced 120 degrees from each other. Shaft 46 is driven at a rate of one revolution per minute whereby the contacts of each group 50, 50a, 50b; 51, 51a, 51b and 52, 52a, 52b are closed in sequence once each minute, or at intervals of approximately twenty seconds apart.

Connected with shaft 41 through suitable reduction gearing 53 and 54 is a relatively long shaft 55 which completes only one revolution during a period of sixty-nine hours,—said shaft having a plurality of pairs of slip-clutch members 56 attached thereto and rotatable therewith, and rheostat contactors 57 being interposed between and gripped by the clutch members of each pair to normally rotate with shaft 55, and adjustable stop members 58 being provided to selectively limit the degree of travel of the respective contactors along with shaft 55. As shown the contactors 57 are cooperable with the respective slide wire resistors 59 all of which may be of like form.

The right hand terminal of each of said resistors 59 is connected through conductor 60 with the stationary switch contact 36 aforementioned. The left hand terminals of the resistors 59 are respectively connected in series with a corresponding number of special resistances designated by the numerals 61 to 66, inclusive, and said groups of resistor and special resistance elements are in turn connected in parallel relation with each other. A fixed E. M. F. generated by the single dry cell battery 67 is then applied across said parallel connected elements, a fixed resistance 68 and a variable resistance 69 being connected in circuit with said battery, the latter resistance being utilized to compensate for variations in voltage of the battery incident to continued use of the latter.

The special resistances 61 to 66, inclusive, are designed in accordance with known principles to provide the desired voltage change per degree or unit of angular travel of the respective contactors 57. Stated another way,—the special resistances are designed in a manner to provide in conjunction with their associated resistances 59 the predetermined rates of temperature rise desired for the several ovens. For instance, the two special resistances 61 and 62 (which are of identical character) are designed to insure a gradual and constant temperature rise at the rate of 17 degrees F. per hour for the particular oven with which the same are associated selectively. This temperature rise of 17 degrees F. per hour is considered ideal when the so-called twenty-two hour cure is to be employed. In effecting this twenty-two hour cure or heat-treatment it is ordinarily desirable to initially subject the articles in the oven to a temperature of approximately 150 degrees F., and as shown the left hand rheostat of the group of six rheostats has its contactor 57 and resistor 59 so positioned angularly relatively to each other that the aforementioned temperature of 150 degrees F. will be initially provided for oven #1,—assuming connection of the contactor 57 with the positive terminal of thermo-couple $11^d$ by means of the communicating rack or device 70.

The device 70 is of very simple construction, and the same comprises essentially a plurality of horizontally extending bus members $70^a$, $70^b$ and $70^c$ which are respectively connected to one terminal of the thermo-couples $11^d$, $12^d$ and $13^d$ of ovens 1, 2 and 3. Arranged crosswise of the bus members $70^a$, $70^b$ and $70^c$ are a plurality of bus members 71 to 76, inclusive, which are respectively electrically connected to the contactors 57 associated with resistors 59. The vertical bus members 71 to 76 are provided with clearance openings at each point where the same cross bus members $70^a$, $70^b$ and $70^c$, and the latter are provided with tapped openings at such points to receive the threaded shanks of suitable plugs or connecting members,—the insulating knobs of three of which are shown at 77, 78 and 79. Thus plug 77 is shown as connecting the thermo-couple of oven 1 with the contactor 57 of the resistor 59 associated with resistance 61; plug 78 is shown as connecting the thermo-couple of oven 2 with the contactor 57 of the resistor 59 associated with resistance 63; and plug 79 is shown as connecting the thermo-couple of oven 3 with the contactor 57 of resistor 59 associated with resistance 66. It will be understood of course that all of the plugs may be positioned in contact with bus member 71 to provide for subjecting all of the ovens 1, 2 and 3 to a like character of temperature control as provided by the characteristics of resistance 61 and its associated resistor 59,—whereas in the particular arrangement or positions of the plugs 77, 78 and 79 illustrated each of the ovens 1, 2 and 3 will be subjected to a different rate of temperature rise.

As aforeindicated the resistances 61 and 62 are of like value, which value is such as to provide a temperature rise of 17 degrees per hour in the oven or ovens selectively associated therewith. This 17 degree rate of temperature rise is most frequently required for proper heat-treatment of the molded insulation articles referred to, and duplication of the control elements affording such rate of temperature rise permits of initiation of operation of a plurality of ovens in sequence to afford heat-treatment of a like or similar character in a plurality of ovens. Let it be assumed for instance that oven 1 has been packed with molded insulation articles and that the heat-treating operation therein has been initiated with the contactor 57 of resistor 59 associated with resistance 61 positioned to provide an initial oven temperature of 150 degrees F., as indicated. With the stop member 58 set as indicated to prevent a rise in temperature in oven 1 above 420 degrees F., the temperature therein will gradually rise at the aforementioned rate of 17 degrees F. per hour for a period of approximately 15.88 hours,—at which time the contactor 57 will engage stop 58 and thus prevent the temperature in oven 1 from rising above the preselected value of 420 degrees F. Moreover, the arrangement is such that the temperature in oven 1 will thereafter remain or be maintained substantially constant at 420 degrees F. for the balance of the curing period.

Assuming that such insulation articles are to be subjected to the so-called 22-hour cure, it will be understood that upon attainment of the temperature of 420 degrees F. the oven will be maintained at such temperature for a further period of approximately 6.12 hours, at which time the cure will be completed. Thereupon the supply of the heating medium to oven 1 may be discontinued as by means of a suitable form of manually operable valve (not shown) or by manually returning the contactor 57 to its extreme left-hand position and by locking the same in such position by a corresponding positioning of its associated stop member 58. Such positioning of contactor 57 will result in continued de-energization of the winding $11^a$ of valve 11, it being understood that such valve is normally biased by gravity or otherwise to its fully closed position.

Further assuming partial completion of the heat-treatment of articles in oven 1 and that oven 2 has been subsequently packed with articles which are to be subjected to a heat treatment of like character. Obviously it would be inexpedient to subject oven 2 at that time to control by the elements utilized in connection with oven 1, as the initial temperature in oven 2 would reach a value too high for proper curing of the articles. Similarly it would be undesirable to allow oven 2 to remain inoperative pending completion of the cure of articles in oven 1. Under the conditions just mentioned the desired result may be obtained by simply utilizing plug 78 to electrically connect bus members 72 and $70^b$ whereby oven 2 is subjected to control by resistor 59 and its associated resistance 62,—the stop 58 in such case being moved to the point marked 420° (representing a limit of 420 degrees F. temperature in oven 2) and the contactor 57 being moved to the point marked 150° to provide the initial temperature of 150 degrees F. in oven 2. It will be seen that by the arrangement aforedescribed two or more of the ovens may be subjected to substantially identical cycles of temperature control under conditions of sequential initiation and partially concurrent continuation of operation thereof.

If any of the ovens are to be utilized for effecting the so-called 32-hour cure, their respectively associated bus members $70^a$, $70^b$ or $70^c$ may be electrically connected with vertical bus member 73 (bus member $70^b$ associated with oven 2 being shown so connected to bus member 73). The value of the special resistance 63 in this case is such that with contactor 57 arranged at the position illustrated an initial temperature of 150 degrees F. will be provided in the oven or ovens controlled thereby,—the stop 58 being shown in a position to limit the temperature in such oven or ovens to a maximum or final value of 420 degrees F. Moreover, the value of resistance 63 is such that the change in temperature of the oven or ovens from 150 degrees F. to 420 degrees F. will be effected at a rate of 10.5 degrees F. change per hour. That is to say, the temperature will change at the aforementioned rate for a period of 25.71 hours, and the temperature will then remain constant at substantially 420 degrees F. for the balance of the 32-hour curing period, namely, 6.29 hours.

Assuming settings of the stops 58 and contactors 57 of the other rheostat devices such as to provide the aforementioned initial temperature of 150 degrees F. and final temperature of 420 degrees F., it may be assumed that resistance 64 is of such value as to provide in conjunction with the other control elements the rate of temperature rise preferred for the so-called 42-hour cure, namely, 6.9 degrees F. rise per hour. The temperature of the oven or ovens would therefore rise at the rate of 6.9 degrees F. per hour for a period of 39.13 hours, and would thereafter remain substantially constant at 420 degrees F. for the balance of the curing period, namely, 2.87 hours.

The 56-hour cure afforded by the combination of special resistance 65 with the other control elements involves a rise in temperature of the oven or ovens at a rate of 4.9 degrees F. per hour for a period of 55.1 hours,—the temperature thereafter remaining substantially constant at the maximum preselected value of 420 degrees F. for the balance of the curing period, namely, 0.9 hour.

The 66-hour cure afforded by the combination of special resistance 66 with the other control elements involves a rise in temperature of the oven or ovens at a rate of 4.15 degrees F. per hour for a period of 65.06 hours,—the temperature thereafter remaining substantially constant at the maximum preselected value of 420 degrees F. for the balance of the curing period, namely, 0.94 hour.

As it will be understood by those skilled in the art, the several resistors 59 might be designed and calibrated to individually embody the resistance characteristics afforded by use of the special resistances 61 to 66, inclusive. By the arrangement illustrated, however, all of the resistances 59 may be of standard form,—the special resistances 61 to 66 being designed or selected to afford the described characteristics aforementioned. In like manner, by merely substituting for the resistances 61 to 66 resistances of different preselected values the cycles of heat treatment by the ovens associated therewith may be varied as desired.

Let it be assumed that ovens 1, 2 and 3 have been packed with molded insulation articles of such character that the articles in oven 1 are to be subjected to the so-called 22-hour cure (as indicated by the positioning of plug 77 and the location of stop 58 and contactor 57 of the rheostat associated with resistance 61; that the articles in oven 2 are to be subjected to the so-called 32-hour cure (as indicated by the positioning of plug 78); and that the articles in oven 3 are to be subjected to the so-called 66-hour cure (as indicated by the positioning of plug 79).

With the various parts of the control system in the positions illustrated, and assuming operation of motor 43 as afore-described, the manner in which the temperature is controlled in oven 1, for instance, may be described as follows: The cam 47 will be operated to effect closure of contacts 50, 50$^a$ and 50$^b$ once during each period of 60 seconds, and assuming closure of the contacts 50$^b$ a circuit will be completed for the coil 34 of the galvanometer. Said circuit may be traced from the upper terminal of said coil by conductor 33 to the left hand side of resistance 16 and through that portion of resistance 16 as determined by the position of contactor 20, by conductor 21 through resistance 26 and coil 24, conductors 22 and 80 through said contacts 50$^b$, conductor 81 through thermo-couple 11$^d$, conductor 82 to bus member 70$^a$, plug 77 and bus member 71, conductor 83 to contactor 57 through a portion of resistor 59 as determined by the positioning of said contactor, by conductor 60 through contacts 36, 35 and thence to the lower terminal of coil 34.

As aforeindicated the arrangement is such that the value of the potential across the terminals of the thermo-couple 11$^d$ is combined with the potential across that portion of resistor 59 as determined by the setting of the aforementioned contactor 57, and the sum of these potential values is balanced against or compared with the potential across that portion of resistance 16 which is determined by the setting of contactor 20. Obviously with oven 1 initially at a relatively low temperature (say, less than 100 degrees F.) the potential generated by thermo-couple 11$^d$ will be of relatively low value and consequently the sum of the values of potential across the terminals thereof and across the aforementioned portion of resistor 56 will be substantially less than the value of the potential across the aforementioned portion of resistance 16. The result is that the galvanometer needle 38 will be deflected toward the right to a position underlying the stationary contact designated L. In definitely timed sequence with respect to closure of contacts 50$^b$ the cam 40 will act to move the member 39 upwardly to clamp needle 38 in engagement with contact L. Inasmuch as contacts 50 and 50$^a$ will likewise have been closed a circuit will be completed for the operating winding 84$^a$ of a relay 84, said circuit extending from line L$^1$ by conductor 85 through a suitable resistance 86, conductor 87 through contacts 50, conductor 88 through contact L and needle 38, conductor 89 through contacts 50$^a$, conductor 90 through said coil 84$^a$ and conductor 91 to line L$^2$.

The contacts 84$^b$ of relay 84 when closed provide an energizing circuit for winding 11$^a$ to effect opening of valve 11, said circuit extending from line L$^1$ by conductors 92, 93 through said contacts 84$^b$, conductor 94 through said winding 11$^a$, and by conductors 95 and 96 to line L$^2$. Valve 11 when thus opened permits a full flow of gas or other combustible fluid to the burner or burners 97, said fluid being ignited by the flame of pilot burner 11$^b$. The contacts 84$^c$ are simultaneously closed to provide a maintaining circuit for winding 84$^a$, said circuit extending from line L$^1$ by conductor 85 through resistance 86, conductor 98 through said contacts 84$^c$, conductor 99 through said winding 84$^a$, and by conductor 91 to line L$^2$.

The means aforedescribed will act to maintain valve 11 open until oven 1 attains and slightly exceeds the initial curing temperature of, say, 150 degrees F., as preselected by the setting of contactor 57 associated with resistor 59 and resistance 61. When the temperature in oven 1 slightly exceeds the value aforementioned a substantial potential will be generated by thermo-couple 11$^d$, and the combined value of the potentials across thermo-couple 11$^d$ and across the portion of resistor 59 associated with resistance 61 will be greater than the value of potential across the aforementioned portion of resistance 16. Thus upon closure of the circuit of coil 34 of the galvanometer, through closure of contacts 50$^b$ in the manner aforedescribed, current will flow in a reverse direction through said coil and needle 38 will be deflected toward the left to underlie the stationary contact designated H. Cam 40 will then act to clamp needle 38 in engagement with contact H, and with contacts 50$^a$ closed a circuit will be provided across lines L$^1$, L$^2$ shunting or short-circuiting the coil 84$^a$. Said circuit may be traced from line L$^1$ by conductor 85, through resistance 86, conductor 98, contacts 84$^c$, conductors 99 and 100 through said contacts 50$^a$, conductor 89, needle 38, contact H, and by conductor 101 to line L$^2$.

Relay 84 thereupon opens to deenergize coil 11$^a$ with consequent closure of valve 11. Valve 11 will of course remain closed pending a drop in the temperature in oven 1 to a value below that predetermined by the setting of the aforementioned contractor 57, whereupon the aforedescribed elements will act to provide for repeated deflection of needle 38 toward the right, with consequent re-opening of valve 11. Valve 11 is thus opened and reclosed as required to effect regulation of the temperature in oven 1 in accordance with the position of the particular contactor 57 associated therewith. Also as aforestated the contactor 57 will be moved in a clockwise direction in very small increments whereby the temperature in said oven is increased gradually and at a substantially constant rate per unit of time until the maximum temperature preselected by the setting of stop 58 has been attained. Thereafter the temperature in oven 1 will be maintained substantially constant at said preselected maximum value pending completion of the heat-treatment or cure of the molded articles therewithin. In other words, with the thermo-couple 11$^d$ of oven 1 connected for control in the manner illustrated, the temperature within said oven will rise from the preselected initial curing temperature of 150 degrees F. at the rate of approximately 17 degrees F. per hour for a period of 15.88 hours, whereupon the preselected final temperature of 420 degrees F. will have been attained, and said maximum temperature will be maintained substantially constant for the further desired period of 6.12 hours to complete the so-called 22-hour cure.

Assuming the illustrated adjustment of the parts 57, 58 and 59 of the rheostat associated with special resistance 63, it is obvious that adjustment and control of the temperature in oven 2 will be effected concurrently with the aforedescribed temperature control of oven 1. Thus the cam member 48 will act to effect closure of contacts 51, 51$^a$ and 51$^b$ for a portion of each one minute period (and during closure of said contacts the contacts 50, 50$^a$ and 50$^b$ controlled by cam 47 and contacts 52, 52$^a$ and 52$^b$ controlled by cam 49 will be permitted to remain in the normally open positions thereof). Closure of contacts 51$^b$ as aforedescribed will provide a circuit for the sensitive coil 34 of the galvanometer, which circuit extends from the upper terminal of said galvanometer to the common electrical connection 23 and conductor 80 (as heretofore traced), thence through said contacts 51$^b$ by conductor 102 through thermo-couple 12$^d$, conductor 103 to bus member 70$^b$, plug 78, bus member 73, conductor 104 to contactor 57, through the portion of resistor 59 as determined by the setting of said contactor, and by conductor 60 and contacts 36, 35 to the lower terminal of said galvanometer coil.

Due to the fact that oven 2 will initially have a temperature therewithin of less than 150 degrees F., substantially no potential will be generated by thermo-couple 12$^d$. Hence coil 34 will act in an obvious manner to cause deflection of needle 38 to a position underlying contact L against which it will be clamped by element 39 through the aforedescribed operation of cam 40. Therefore a circuit will be completed for the operating coil 105$^a$ of relay 105, said circuit extending from line L$^1$ by conductor 106 through resistance 107, conductor 108 to and through contacts 51, conductor 88, contact L, needle 38, conductor 89, contacts 51$^a$, conductor 109 through said coil 105$^a$, and by conductor 91 to line L$^2$. Contacts 105$^b$ of relay 105 when closed complete an energizing circuit for the operating winding 12$^a$ of valve 12,—said circuit being obvious. Similarly the contacts 105$^c$ of relay 105 when closed provide a maintaining circuit for the latter independently of contact L and needle 38. Valve 12 will therefore be maintained in open position pending attainment of a temperature slightly in excess of 150 degrees F., as preselected by the setting of contactor 57, at which time the potential generated by thermo-couple 12$^d$, plus the potential across the aforementioned portion of resistor 59 will exceed the value of the potential across the preselected portion of the pyrometer resistance 16, and needle 38 will be deflected toward the left to underlie contact H and when clamped against the latter by intermittent operation of member 39 through the medium of cam 40 coil 105$^a$ will be short-circuited by connections extending from line L$^2$ by conductor 101, contact H, needle 38, conductor 89, contacts 51$^a$, conductor 109, coil 105$^a$, and conductor 91 to line L$^2$. Valve 12 is thus closed or opened automatically to maintain the desired degree of temperature within oven 2, it being understood that contactor 57 is moved gradually in a clockwise direction to effect a rise in temperature of oven 2 at the desired rate of 10.5 degrees F. per hour. After a period of 25.71 hours oven 2 will have attained the desired final temperature of 420 degrees F., and contactor 57 associated with resistor 59 and resistance 63 will thereupon engage stop 58 to maintain oven 2 at said final temperature for the remainder of the 32-hour curing period, namely 6.29 hours.

With the parts arranged as illustrated, the manner in which valve 13 is automatically controlled to provide the initial curing temperature of 150 degrees F. and the final temperature of 420 degrees F. in oven 3, and the manner in which said temperature rise is effected gradually at the rate of 4.15 degrees F. for a period of 65.06 hours and the temperature thereafter maintained substantially constant for 0.94 hour to provide the complete 66-hour cure, will be apparent from the foregoing description of the control of ovens 1 and 2.

Obviously if desired, the contactors 57 associated with resistors 59 may be placed in other positions than those indicated to preselect initial oven temperatures other than the temperature of 150 degrees F. aforementioned. Suitable dial members (not shown) are provided to facilitate preselection of the initial and final oven temperatures. Such dials, moreover, cooperate with the contactors 57 or pointers (not shown) associated therewith to indicate the instantaneous temperatures obtaining in the respective ovens at all points in the selected cycles of temperature control.

The flexibility of the temperature controlling system herein disclosed will be apparent to those skilled in the art. By employment of the methods and means herein disclosed uniformity in heat-treatment of molded articles of corresponding shape, size and composition is insured, and definiteness in control of each particular cycle of heat-treatment is insured while the degree of manual attention and labor required is reduced to a minimum.

As will be understood by those skilled in the art, the temperature compensating device represented by the coil 24 (which has the desired positive temperature coefficient of resistance), in conjunction with fixed resistances 26, 27, 28 and variable resistance 32, together with the source of E. M. F. 29, provides a potential of equal and opposite value with respect to the change in value of the potential generated by the respective thermo-couples as an incident to a change in the temperature of the cold-junctions of said thermo-couples.

As will be apparent from the foregoing description, the contactors 57 of the potentiometer rheostats which are to be actively associated with one or more of the respective ovens may be initially positioned in any desired angular positions to preselect the desired final temperature or temperatures to be attained within said ovens,—the stops 58 being in such case initially positioned in locking engagement with their associated contactors to insure maintenance of said temperatures at said preselected values when attained. Manifestly when the control system is so operated the final temperatures preselected for the several ovens will be very rapidly attained, since the valves 11, 12 or 13 will be maintained in open position pending attainment of the preselected temperatures.

In like manner, either before or after attainment of the final temperatures preselected for the ovens in the manner just described, the respective contactors 57 and their associated stops 58 may be moved simultaneously to other positions to preselect temperatures different from those obtaining in the respective ovens, and said last selected temperatures when attained will be maintained substantially constant by means of the control elements heretofore described.

What I claim as new and desire to secure by Letters Patent is:

1. In a control system of the character described, in combination, a heating chamber, means for supplying a heating medium to said chamber, means for varying the rate of supply of said heating medium to said chamber to provide a temperature therein of predetermined value, and control means for said rate varying means comprising a potentiometer type pyrometer controller and means for varying the potential across a portion of the latter, a thermo-couple located within said chamber and subjected to the temperature conditions therewithin, a potentiometer type rheostat and electrical connections between the latter and said thermo-couple, additional electrical connections to provide for balancing the sum of the potentials across the terminals of said thermo-couple and a portion of said rheostat against the potential of said pyrometer controller, a galvanometer having its operating coil subjected to the differential value of said combined potentials and said last mentioned potential, and means for subjecting said rate varying means to control by said galvanometer.

2. In a control system of the character described, in combination, a heating chamber, means for supplying a heating medium to said chamber, means for varying the rate of supply of said heating medium to said chamber to provide a temperature therein of predetermined value, and control means for said rate varying means comprising a potentiometer type pyrometer controller and means for varying the potential across a portion of the latter, a thermo-couple located within said chamber and subjected to the temperature conditions therewithin, a potentiometer type rheostat and electrical connections between the latter and said thermo-couple, additional electrical connections to provide for balancing the sum of the potentials across the terminals of said thermo-couple and a portion of said rheostat against the potential of said pyrometer controller, a galvanometer having its operating coil subjected to the differential value of said combined potentials and said last mentioned potential, means for subjecting said rate varying means to control by said galvanometer, means for adjusting said potentiometer rheostat to enable preselection of a predetermined initial temperature within said chamber, and power driven means for effecting substantially continuous adjustment of said rheostat to thereby effect a definite and gradual change of the temperature within said chamber.

3. In a control system of the character described, in combination, a heating chamber, means for supplying a heating medium to said chamber, means for varying the rate of supply of said heating medium to said chamber to provide a temperature therein of predetermined value, and control means for said rate varying means comprising a potentiometer type pyrometer controller and means for varying the potential across a portion of the latter, a thermo-couple located within said chamber and subjected to the temperature conditions therewithin, a potentiometer type rheostat and electrical connections between the latter and said thermo-couple, additional electrical connections to provide for balancing the sum of the potentials across the terminals of said thermo-couple and a portion of said rheostat against the potential of said pyrometer controller, a galvanometer having its operating coil subjected to the differential value of said combined potentials and said last mentioned potential, means for subjecting said rate varying means to control by said galvanometer, means for adjusting said potentiometer rheostat to enable preselection of a predetermined initial temperature within said chamber, power driven means for effecting substantially continuous adjustment of said rheostat to thereby effect a definite and gradual change of the temperature within said chamber, and associated means for automatically interrupting the adjustment of said rheostat to thereafter insure maintenance of a substantially constant temperature of predetermined value within said chamber.

4. In a control system of the character described, in combination, a plurality of heating chambers, means for supplying a heating medium to said chambers individually, a plurality of thermo-couples respectively subjected to the temperatures within said heating chambers, a plurality of adjustable potentiometer type rheostats with which each of said thermo-couples may be connected selectively to provide a combined electrical potential of predetermined value, an adjustable master potentiometer type rheostat and electrical connections to provide for balancing of the potential value preselected by adjustment of the last mentioned rheostat with respect to the value of said combined electrical potential, a galvanometer having a sensitive coil to be subjected to the differential value of said potentials, and means associated with said individual supply means and subject to sequential control by said galvanometer whereby the instantaneous temperatures of the respective heating chambers may be definitely regulated.

5. In a control system of the character described, in combination, a plurality of heating chambers, means for supplying a heating medium to said chambers individually, a plurality of thermo-couples respectively subjected to the temperatures within said heating chambers, a plurality of adjustable potentiometer type rheostats with which each of said thermo-couples may be connected selectively to provide a combined electrical potential of predetermined value, an adjustable master potentiometer type rheostat and electrical connections to provide for balancing of the potential value preselected by adjustment of the last mentioned rheostat with respect to the value of said combined electrical potential, a galvanometer having a sensitive coil to be subjected to the differential value of said potentials, and means associated with said individual supply means and subject to sequential control by said galvanometer whereby the instantaneous temperatures of the respective heating chambers may be definitely regulated, said first mentioned rheostats having parts thereof operable to preselect the initial and final temperatures of the heating chambers respectively associated therewith.

6. In a control system of the character described, in combination, a plurality of heating chambers, means for supplying a heating medium to said chambers individually, a plurality of thermo-couples respectively subjected to the temperatures within said heating chambers, a plurality of adjustable potentiometer type rheostats with which each of said thermo-couples may be connected selectively to provide a combined electrical potential of predetermined value, an adjustable master potentiometer type rheostat and electrical connections to provide for balancing of the potential value preselected by adjustment of the last mentioned rheostat with respect to the value of said combined electrical potential, a galvanometer having a sensitive coil to be subjected to the differential value of said potentials, and means associated with said individual supply means and subject to sequential control by said galvanometer whereby the instantaneous temperatures of the respective heating chambers may be definitely regulated, said first mentioned rheostats having parts thereof operable to preselect the initial and final temperatures of the heating chambers respectively associated therewith and to individually preselect the rates of temperature change per unit of time for the respective heating chambers.

7. In a control system of the character described, in combination, a plurality of heat-treating ovens for insulation articles and the like, a gaseous fuel burner for each of said ovens, a common source of gaseous fuel supply, valves individual to said burners for controlling the flow of gaseous fuel thereto, said valves being normally biased to closed position and each having a winding associated therewith respectively and adapted when energized to effect opening thereof, control means for said windings comprising a galvanometer having its needle deflectable to opposite extreme positions to complete and interrupt the energizing circuits of said windings, associated means for rendering said windings subject to control sequentially and independently of each other by said galvanometer needle, and control means for said galvanometer comprising a single potentiometer type pyrometer controller, a plurality of thermo-couples each to be subjected to the temperature within one of said ovens respectively, a plurality of potentiometer rheostats, means for sequentially connecting each of said thermo-couples with one of said potentiometer rheostats selectively to provide a potential of given value, means for balancing said potential against the potential of said pyrometer controller, and means for subjecting said galvanometer to the differential value of said potentials.

8. The method of controlling the temperature of a heating chamber or the like, which comprises subjecting a thermo-couple to the temperature within said chamber to generate a potential which varies directly in accordance with said temperature, adding to said potential a variable potential of predetermined value, electrically combining said potentials and balancing the sum thereof against the adjustable and pre-adjusted potential of a standard potentiometer controller, and definitely varying the temperature of said heating chamber directly in accordance with variations in the differential value of said potentials.

9. The method of controlling the temperature of a heating chamber or the like, which comprises subjecting a thermo-couple to the temperature within said chamber to generate a potential which varies directly in accordance with said temperature, adding to said potential a variable potential of predetermined value, electrically combining said potentials and balancing the sum thereof against the adjustable and pre-adjusted potential of a standard potentiometer controller, definitely varying the temperature of said heating chamber directly in accordance with variations in the differential value of said potentials, and continuously modifying the value of said variable potental to thereby insure a definite and gradual change in the temperature of said heating chamber.

10. The method of jointly controlling the temperatures within a plurality of curing ovens or the like, which comprises subjecting a thermo-couple within each oven to the temperature thereof to generate a potential which varies directly in accordance with said temperature, adding to said potential a variable potential of predetermined value, electrically combining said potentials and periodically balancing the sum thereof against the adjustable and pre-adjusted potential of a standard potentiometer controller, and definitely varying the respective temperatures of said ovens directly in accordance with variations in the respective differential values of said potentials.

11. The method of jointly controlling the temperatures within a plurality of curing ovens or the like, which comprises subjecting a thermo-couple within each oven to the temperature thereof to generate a potential which varies directly in accordance with said temperature, adding to said potential a variable potential of predetermined value, electrically combining said potentials and periodically balancing the sum thereof against the adjustable and pre-adjusted potential of a standard potentiometer controller, definitely varying the respective temperatures of said ovens directly in accordance with variations in the respective differential values of said potentials, and continuously modifying the values of each of said variable potentials to thereby insure definite and gradual changes in the temperatures of the respective ovens.

EDWIN X. SCHMIDT.